(12) United States Patent
Waggoner

(10) Patent No.: US 11,483,513 B1
(45) Date of Patent: Oct. 25, 2022

(54) TIME, CONTENT, AND PRESENCE BASED ADJUSTMENT OF AUDIO AND VIDEO PLAYBACK LEVELS AND MODES

(71) Applicant: Amazon Technologies, Inc., Seattle, WA (US)

(72) Inventor: Charles Benjamin Waggoner, Portland, OR (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/916,359

(22) Filed: Jun. 30, 2020

(51) Int. Cl.
*H04N 5/57* (2006.01)
*H04N 5/60* (2006.01)

(52) U.S. Cl.
CPC ............... *H04N 5/57* (2013.01); *H04N 5/60* (2013.01)

(58) Field of Classification Search
None
See application file for complete search history.

(56) References Cited

U.S. PATENT DOCUMENTS

| 10,657,968 B1* | 5/2020 | Raman | G16H 50/30 |
| 2020/0344508 A1* | 10/2020 | Edwards | H04N 21/25866 |

\* cited by examiner

*Primary Examiner* — Omar S Parra
(74) *Attorney, Agent, or Firm* — Eversheds Sutherland (US) LLP

(57) ABSTRACT

Systems, methods, and computer-readable media are disclosed for determining settings and parameters for presenting media content based on input data from a surrounding environment. Example methods may include determining input data such as time and brightness in an environment, determining adjusted content settings based on the input data, and causing an electronic device to adjust content settings for presenting the media content based on the input data. For example, the adjusted content settings may involve audio and/or visual settings. The systems and methods may also gradually transition the content settings based on an impending change in the environment.

20 Claims, 7 Drawing Sheets

TIME, CONTENT, AND PRESENCE BASED ADJUSTMENT OF AUDIO AND VIDEO PLAYBACK LEVELS AND MODES

BACKGROUND

For decades media content has been an important part of daily life, with several rooms of households and offices often having a display of some kind. It is not uncommon for a display such as a television to play media content for long period of times (e.g., several hours) throughout the day. Due to the extended length of time media content may be viewed and otherwise presented, environment conditions outside a home (e.g., daylight) and even inside may change. For example, a viewer may begin watching media content during the day and continue to watch media content after sunset. As the environment conditions change, it may be difficult to see and/or hear the media content presented.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
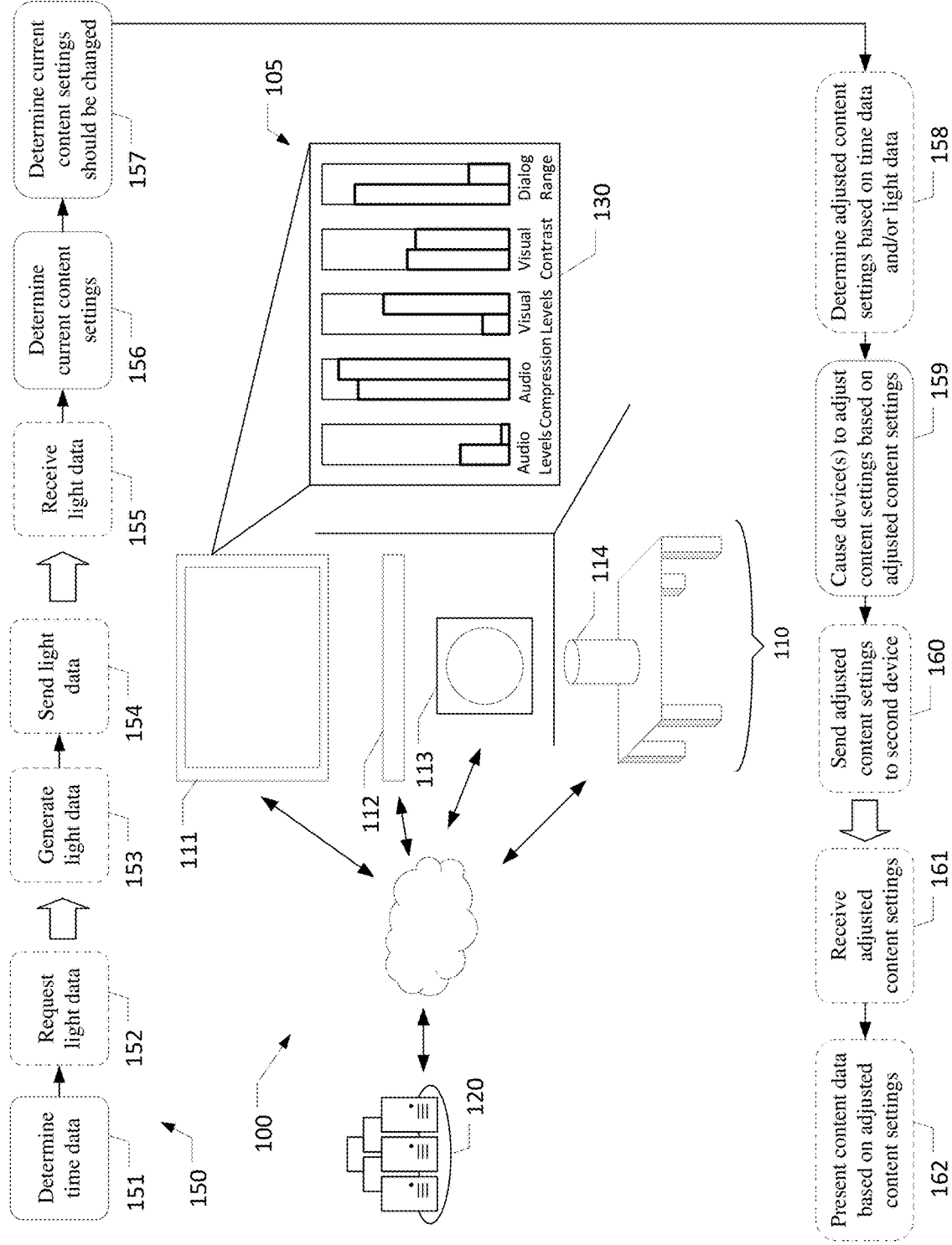
FIG. 1 is a schematic illustration of an example use case for determining environment conditions and adjusting content settings in accordance with one or more example embodiments of the disclosure.

The systems and methods herein may be used to determine adjusted media content settings (e.g., playback options and/or settings) for one or more devices based on certain input data corresponding to changes in an environment to improve the audio and visual qualities of the media content presented on the one or more electronic devices.

Electronic devices such as televisions, speakers (e.g., sound bar), subwoofers, tablets, smart phones, computer displays, personal computers, amplifiers, and the like may play, broadcast, and/or present audio and/or visual media content. For example, a living room inside a residential home may include a television, one or more speakers and a subwoofer. The living room may further include an electronic device that is a connected device that is connected to the cloud and/or Internet (e.g., via Wi-Fi or a cellular network). An electronic device (e.g., connected device) may further be in communication with one or more other electronic devices (e.g., via Bluetooth or Wi-Fi Direct). In one example, the connected device may be a smart home hub, smart speaker, or other wirelessly connected device.

The electronic devices may run applications or access applications (e.g., local applications, web-based applications, websites, etc.) to adjust settings (e.g., parameters) for which media content is presented on the electronic devices. For example, an electronic device may run a local application for controlling media content. The application may set, adjust, and/or influence settings for presenting media content on the electronic device as well as other electronic devices. The application may be in communication with another application responsible for selecting and/or providing media content to present on the electronic device(s) (e.g., a streaming application). Alternatively, the same application may be responsible for setting, adjusting and/or influencing settings for controlling media content as well as selecting and/or providing media content to present on the electronic device(s).

The application running on the electronic device may determine and/or obtain certain input data relevant to an environment in which electronic device(s) presenting media content are present in. In one example, a television, speaker and subwoofer may be present in the same room (e.g., living room of a house). To determine input data relevant to the environment, the electronic device may request and/or obtain input data from other electronic devices. For example, the electronic device running the application may request that a second electronic device with a camera or light sensor provide input data indicative of ambient light and/or noise in the environment. Alternatively, or in addition, the electronic device may be in communication with one or more servers (e.g., via Wi-Fi or a cellular network) and otherwise may access the Internet. For example, a server may provide information about the day, time, and/or sunset information.

The electronic device running the application may use the input data from electronic devices or servers. For example, the electronic device may determine from a server that the current time is passed a sunset time. Further, ambient light input data may be received from a second electronic device. An ambient light value may be indicative of the sun having set. The application running on the electronic device may determine based on the input data corresponding to time and ambient light that it is now dark outside, and thus there has been a change in the exterior environment.

Upon determining a change in the environment, the application running on the electronic device may cause the content settings for presenting the media content on one or more electronic devices to be adjusted to improve the ability of the user to hear and/or see the media content. For example, the application running on the electronic device may apply information about the environmental change and/or the input data to one or more algorithms to determine appropriate content settings for the changed environment. The algorithm may be designed and/or trained to output certain content settings based on the input data. Alternatively, a database or table may be consulted using the environmental change and/or input data to determine a default content setting applicable to the environmental change. In another example, the application running on the electronic device may apply information about the environmental change and/or the input data to one or more algorithms to determine a default content setting (e.g., UHDA "Filmmaker Mode" (FMM)) applicable to the environmental change. In yet another example, the input data and/or information about the environmental change may be applied to a second application running on the same electronic device or different device (e.g., server) to determine a default content setting applicable to the environmental change. Content settings may include but are not limited to brightness levels, audio levels, color contrast settings, color settings, pitch settings, dynamic range, dialog levels, and/or closed captioning settings.

The application running on the electronic device may further use the input data obtained by the electronic device and/or received from other electronic devices to gradually transition content settings based on an impending change in the environment. For example, a user may begin a movie at 4:30 pm, before sunset. The application running on the television may determine that the movie is 2.5 hours long and that sunset occurs at 5:30 pm. Accordingly, the application may determine transition content settings for gradually decreasing the brightness of the display of the television as the sun sets. For example, the application may apply the current time and sunset time to an algorithm to determine a series of transition content settings at 2-minute increments between 4:30 pm and 5:30 pm, gradually decreasing the brightness of the display of the television.

Referring to FIG. 1, an example use case 100 for adjusting content settings (e.g., playback options and/or settings) based on input data corresponding to environment conditions is illustrated in accordance with one or more example embodiments of the disclosure. In the illustrated example, an electronic device 110 (e.g., electronic device 111) may run and/or access application 105 that may determine input data and/or receive input data from other electronic devices 110 (e.g., electronic devices 112, 113, and 114), may determine that an environment condition has changed or will change and/or, based on the input data, may alter content settings for displaying and/or presenting media content on the electronic devices 110. In one example, input data may be audio data, visual data, time data, location data, sunset and/or sunrise data, weather data, schedule data, user account data, voice data, biometric data, and the like.

Electronic devices 110 may be any electronic device that may communicate with one or more servers and/or other electronic devices, via any well-known wired or wireless system (e.g., Wi-Fi, cellular network, Bluetooth, Bluetooth Low Energy (BLE), near field communication protocol, etc.). Electronic device 110 may be any computing device with a processor and may include a user input (e.g., touch screen, camera, light sensors, buttons, microphone, keyboard, touchpad, etc.), a display (e.g., screen), speakers and/or subwoofers.

In the example illustrated in FIG. 1, electronic device 111 is a television, electronic device 112 is a speaker (e.g., sound bar), electronic device 113 is a subwoofer, and electronic device 114 is a connected device. Electronic device 111 may be any type of television, such as a smart television that may be in communication with one or more servers and/or other electronic devices, via any well-known wired or wireless system (e.g., Wi-Fi, cellular network, Bluetooth, Bluetooth Low Energy (BLE), near field communication protocol, etc.). Electronic device 112 may be one or more speakers such as a sound bar and may be in communication with electronic device 111. Electronic device 113 may be one or more subwoofers and may be in communication with electronic device 111. Electronic device 114 may be a connected device that is connected to the cloud and/or Internet (e.g., via Wi-Fi or a cellular network), may communicate with electronic device 110 and may further be in communication with one or more other electronic devices (e.g., via Bluetooth or Wi-Fi Direct). In one example, electronic device 114 may be a smart home hub, smart speaker, or other wirelessly connected device. It is further understood that electronic devices 110 may be any other electronic device (e.g., tablet, e-reader, wearable device, connected device, desktop computer, laptop computer, one or more servers, or the like). Electronic device 110 is described in greater detail below with respect to FIG. 6.

Application 105 may be one or more applications or modules run on and/or accessed by electronic device 110. Application 105 may be a local application, web-based application, website, and/or any other type of application. In one example, application 105 may be media content streaming application and may determine, obtain, and/or present media content for presentation on one or more electronic devices 110. In another example, application 105 may be in communication with a media content streaming application and/or any other application, software, and/or hardware for presenting media content.

Server 120 may be one or more computing devices in communication with an electronic device 110 (e.g., electronic device 111 and/or electronic device 114). Server 120 may include one or more servers and/or otherwise communicate with other servers, databases, datastores, and the like. Server 120 may be a computing device with a processor and may run one or more applications in communication with application 105. In the example where application 105 is a web-based application, application 105 or a portion thereof may run on server 105.

As shown in FIG. 1, electronic device 111 may run and/or access application 105. Further electronic device 111 may communicate with electronic device 112, electronic device 113, electronic device 114 and/or server 120 (e.g., via Wi-Fi or a cellular network). Electronic device may present media content via a display and/or speakers incorporated into electronic device 111. Further electronic device 111 may coordinate with electronic device 112 to play media content via speakers of electronic device 112 and may coordinate with electronic device 113 to produce low-pitched audio frequencies known as bass via one or more subwoofers. Electronic device 111 may further communicate with server 120 and/or electronic device 114 to obtain input data. In one example, electronic devices 110 may all be positioned in one room or through multiple rooms in a residence. Server 120 may be a remote server. It is understood that application 105 may run electronic devices 112, 113 and/or 114.

To initiate the actions of adjusting content settings via application 105 based on input data corresponding to environment conditions around electronic device 110, an example process flow 150 is presented and may be performed, for example, by one or more modules at electronic device 110 (e.g., electronic device 111). The electronic device 110 may include at least one memory that stores computer-executable instructions and at least one processor configured to access the at least one memory and execute the computer-executable instructions to perform various actions or operations, such as one or more of the operations in the process flow 150 of FIG. 1.

At block 151, input data in the form of time data may be determined by application 105. For example, application 105 may consult with an internal clock and/or timer to determine the time. In one example, the time may be 4:30 pm or 16:30. The time may further include the time zone in which electronic device 111 is present (e.g., Pacific Standard Time). Alternatively, electronic device 110 may consult with server 120 to determine time data.

At optional block 152, application 105 may request light data from another electronic device 110. For example, application 105 may cause electronic device 111 to request light data from electronic device 114 which may include a camera and/or light sensor. In one example, electronic device may send a request for ambient light data in the environment of electronic device 111 and electronic device 114. The ambient light data may be indicative of a brightness level and/or amount of light in the environment. A sunny day may result in a high brightness value and a dark night may result in a relatively low brightness level. At optional block 153, electronic device 114 may determine and/or otherwise generate light data. At optional block 154, electronic device 114 may send the requested light data to electronic device 111 (e.g., via Wi-Fi or Bluetooth).

At optional block 155, application 105 may receive the light data generated by and/or otherwise determined by electronic device 114. In another example, light data may be an image captured by electronic device 114 of the environment of electronic device 111. From the image, application 105 may determine a brightness level and/or value corresponding to the amount of light in the environment. It is further understood that electronic device 111 may alternatively include a camera and/or light sensor for determining ambient light levels.

At block 156, application 105 may determine current content settings of electronic device 111. Content settings may be audio settings (e.g., display settings) such as brightness settings, color contrast settings, saturation settings, tint settings, backlight, hue, color filter settings (e.g., gray level, blue level, black level), sharpness settings, pixel settings, pixel transition settings, and any other well-known visual settings. Content settings may further include audio settings (e.g., speaker and/or subwoofer settings) such as sound settings, pitch settings, base settings, audio contrast, dynamic range, dialog clarity, and any other well-known audio settings. Alternatively, content settings may correspond to predefined default content settings (e.g., default settings determined by a brand and/or manufacturer, unique to a television model and/or standardized industry settings). For example, a predefined default setting may be filmmaker mode defined by the UHD Alliance (UHDA). Other predefined default content settings may include nighttime mode, sports mode, high definition mode and any other well-known predefined default content settings. The predefined default content settings may pre-determine the foregoing types of visual and audio settings. To determine the current content settings, application 105 may request and/or otherwise determine this information from electronic device 111. In one example, a second application (e.g., default settings controller) in communication with application 105 may run on electronic device 111 and may be responsible for managing the content settings of electronic device 111 and/or other electronic devices 110 and/or causing electronic device 111 and/or other electronic devices to present media content according to the content settings.

At block 157, application 105 may determine that the current content settings should be changed. This determination may be based, at least in part, on input data. For example, application 105 may base the determination that the current content settings should be changed on the time data and/or the light input data. In one example, an environment value database may be consulted. The environment value database may include several different environment values that correspond to different input data values. For example, application 105 may apply the time data and the light data to the database to determine that a certain environment value entry in the database is relevant to both types of input data. An environment value may indicate a type of environment such as, night-time, school night, daytime, cloudy weather, background conversations, loud appliances, and any other environment type that describes a type of environment in which the electronic devices are present. Alternatively, or in addition, application 105 may apply the input data into an algorithm designed to produce a value or set of values that correspond to an environment value. In another example, the value or set of values may be applied to the environment value database to determine a corresponding environment value entry.

An environment value based on current content settings may also be determined. For example, application 105 may apply the current content settings to the environment value database to determine that a certain environment value entry in the database is relevant to current content settings. Alternatively, or in addition, application 105 may apply the current content settings to an algorithm designed to produce a value or set of values that correspond to an environment value. In one example, the values or set of values may then be applied to the environment value database to determine a corresponding environment value entry. Application 105 may compare the values or set of values based on the current content settings to the values or set of values based on the input data to determine that the environment value has changed (e.g., if the values or set of values based on the input data is different than the values or set of values based on the current content settings). Alternatively, the environment value based on the input data may be compared to the environment value based on the current content settings to determine that the content settings should be changed (e.g., if the environment value based on the input data is different than the environment value based on the current content settings).

At optional block 158, application 105 may determine adjusted content settings based on the input data (e.g., time data and/or light data). For example, from the environment value based on the input data, associated adjusted content settings may be determined. In one example, the environment value based on the input data may be applied to an algorithm to determine the adjusted content settings. Alternatively, the input data itself may be applied to the algorithm to determine the adjusted content settings. In yet another example, the same environment value database may be consulted to determine an entry corresponding to the environment value based on the input data and determine content settings associated with that environment value.

The adjusted content settings may, for example, be audio settings (e.g., display settings) such as brightness settings, color contrast settings, saturation settings, tint settings, backlight, hue, color filter settings (e.g., gray level, blue level, black level), sharpness settings, pixel settings, pixel transition settings, and any other well-known visual settings.

Additionally, or alternatively, adjusted content settings may be audio settings (e.g., speaker and/or subwoofer settings) such as sound settings, pitch settings, base settings, audio contrast, dynamic range, dialog clarity, and any other well-known audio settings. As shown in FIG. 1, in one example, the content settings may include content settings 130 which may include parameters such as audio level settings, audio contrast settings, visual level settings, visual contrast settings, and dialog range settings. Alternatively, adjusted content settings may correspond to predefined default content settings (e.g., default settings determined by a brand and/or manufacturer, unique to a television model and/or standardized industry settings).

At block 159, application 105 may cause electronic device(s) to adjust current content settings based on the adjusted content settings determined at block 158. For example, application 105 may cause the electronic device 111 to adjust its content settings based on the adjusted content settings determined at block 158. This may include audio content settings and/or visual content settings. Alternatively, application 105 may send the input data to a second application running on an electronic device and/or server 120 and instruct the second application that the current content settings need to be adjusted based on the input data.

At optional block 160, application 105 may cause other electronic devices 110 (e.g., electronic device 112 and/or electronic device 113) to adjust their content settings based on the adjusted content settings. Again, this may include audio content settings and/or visual content settings. In one example, electronic device 111 may communicate instructions to adjust content settings directly to the other electronic devices. In another example, electronic device 111 may instruct server 120 and/or connected device 110 to send instructions to other electronic devices 110 to adjust their content settings. It is further understood, that based on the adjusted content settings, application 105 may instruct one or more devices to no longer play media content (e.g., subwoofer).

At optional block 161, the other electronic devices (e.g., electronic device 112 and electronic device 113) may receive the adjusted content settings from electronic device 111, electronic device 114 and/or server 120 and may adjust content settings on the respective device based on the received adjusted content settings. At optional block 162, the electronic devices in receipt of the adjusted content settings may present media content data based on the adjusted content settings.

Illustrative Process and Use Cases

FIGS. 2A-2D depict example process flows for determining environment conditions based on input data and adjusting content settings. Some or all of the blocks of the process flows in this disclosure may be performed in a distributed manner across any number of devices. Some or all of the operations of the process flow may be optional and may be performed in a different order.

Figure 2A:
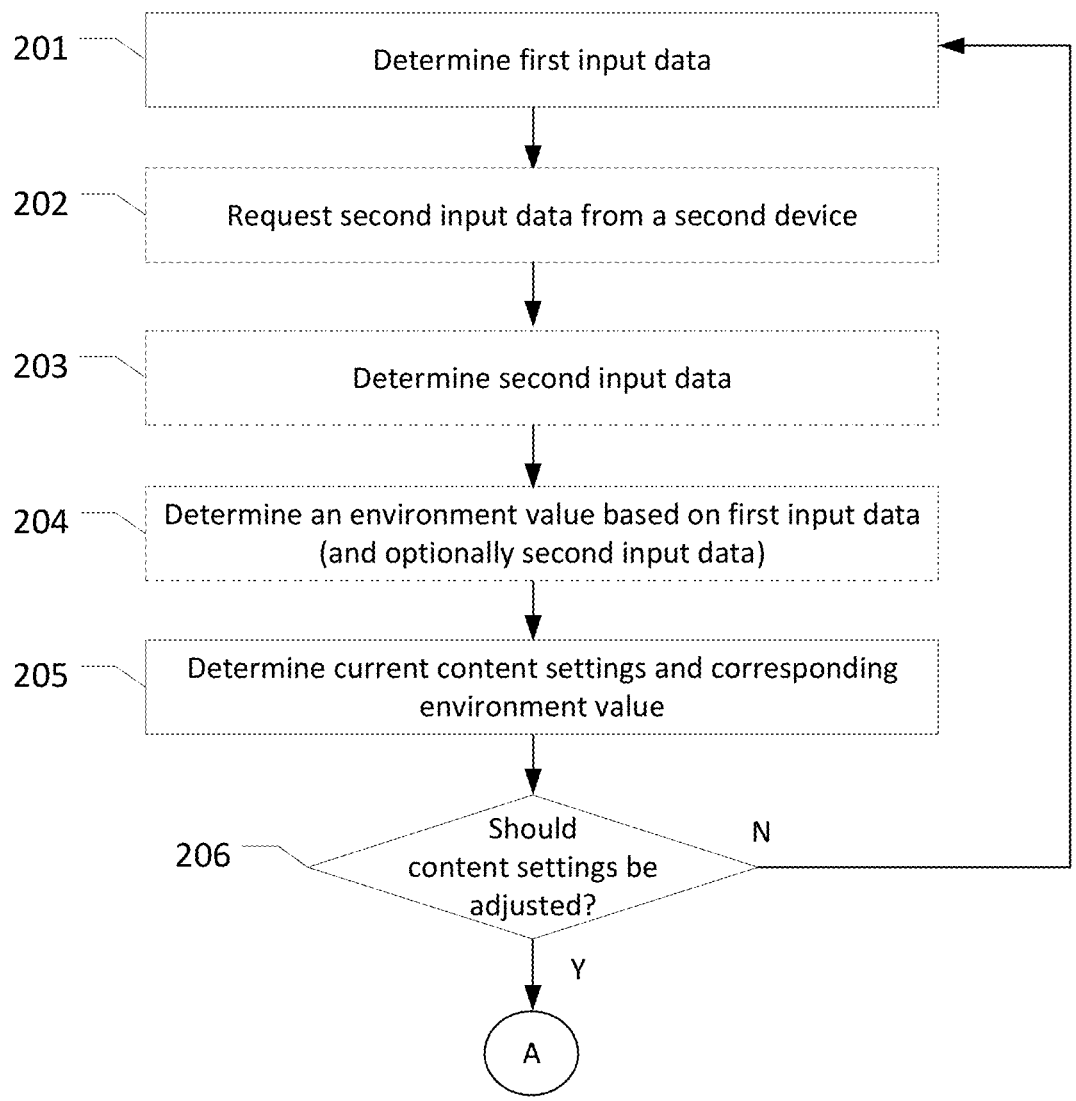
FIGS. 2A-2D are schematic illustrations of example process flows for determining environment conditions and adjusting content settings in accordance with one or more example embodiments of the disclosure.

Referring now to FIG. 2A, an example process flow for determining if content settings should be adjusted is depicted in accordance with one or more example embodiments of the disclosure. At block 201, computer-executable instructions stored on a memory of a device, such as an electronic device and/or server, may be executed to determine a first type of input data. For example, the application may determine the time, the date, the type of content played on an electronic device, and/or any other information available to the application. In one example, a television running the application may determine the time in the time zone of the television. The application may periodically determine input data. For example, the application may periodically determine or otherwise obtain input data (e.g., every 10 minutes). Alternatively, the application may receive instructions and/or information causing the application to determine input data. In one example, a connected device may run a smart home application or otherwise communicate with a smart home application. The smart home application may inform the application via the connected device that lights have been turned off in the residence. Based on this information, the application may determine input data (e.g., time data and/or light data).

At optional block 202, computer-executable instructions stored on a memory of a device, such as an electronic device and/or server, may be executed to request a second type of input data from a second device. For example, the application may request that a connected device having a camera or light sensor send the application input data corresponding to the ambient light in the environment surrounding the electronic device. Other types of input data that the application may request from other electronic devices include, for example, voice input data, sound input data, schedule input data, weather input data, and any other type of information and/or data that could be collected from the surrounding environment using a camera, microphone, sensor and/or any hardware or software for collecting input data.

At optional block 203, computer-executable instructions stored on a memory of a device, such as an electronic device and/or server, may be executed to receive the requested input data. As explained above, an electronic device running the application may send the request for input data directly to another electronic device (e.g., via Bluetooth or Wi-Fi). Alternatively, the electronic device running the application may instruct a connected device or even a server in communication with another electronic device to request the input data. The other electronic device may send the requested input data to the electronic device running the application in the same manner.

At optional block 204, computer-executable instructions stored on a memory of a device, such as an electronic device and/or server, may be executed to determine an environment value based on first input data and/or second input data. For example, as explained above, the application may apply the input data to an environment value database to determine a certain environment value entry in the database that is relevant to the input data. Alternatively, or in addition, the application may apply the input data to an algorithm designed to produce a value or set of values that correspond to an environment value. In one example, the values or set of values may then be applied to the environment value database to determine a corresponding environment value entry.

At optional block 205, computer-executable instructions stored on a memory of a device, such as an electronic device and/or server, may be executed to determine the current content settings and a corresponding environment value. The application running on the electronic device and/or server may manage the current content settings and thus may know the current content settings at any given time. Alternatively, the application may be in communication with a second application running on the same electronic device, the server, and/or another electronic device that is responsible for managing and/or selecting the content settings. The application may request and receive information about the current content settings from the second application. As explained above, the content settings may involve audio and/or visual content settings and/or predefined content settings.

As explained above, the application may apply the current content settings to an environment value database to determine that a certain environment value entry in the database is relevant to current content settings. Alternatively, or in addition, the application may apply the current content settings to an algorithm designed to produce a value or set of values that correspond to an environment value. In one example, the values or set of values may then be applied to the environment value database to determine a corresponding environment value entry.

At decision 206, computer-executable instructions stored on a memory of a device, such as an electronic device and/or server, may be executed to determine whether content settings should be adjusted. The application may compare the values or set of values based on the current content settings to the values or set of values based on the input data to determine that the environment value has changed (e.g., if the values or set of values based on the input data is different than the values or set of values based on the current content settings). Alternatively, the environment value based on the input data may be compared to the environment value based on the current content settings to determine that the content settings should be adjusted (e.g., if the environment value based on the input data is different than the environment value based on the current content settings). If it is determined that the environment values are different and thus the content settings should be adjusted, then the point A is initiated. However, it is determined that the environment values are the same and thus the content settings do not need to be adjusted, block 201 may be initiated once again.

While FIG. 2A illustrates a two different input values, it is understood that any number and any type of input values may be determined, received, and/or applied to the algorithm and/or input environment value database. It is further understood that the term algorithm may include one or more algorithms and/or neural networks.

Figure 2B:
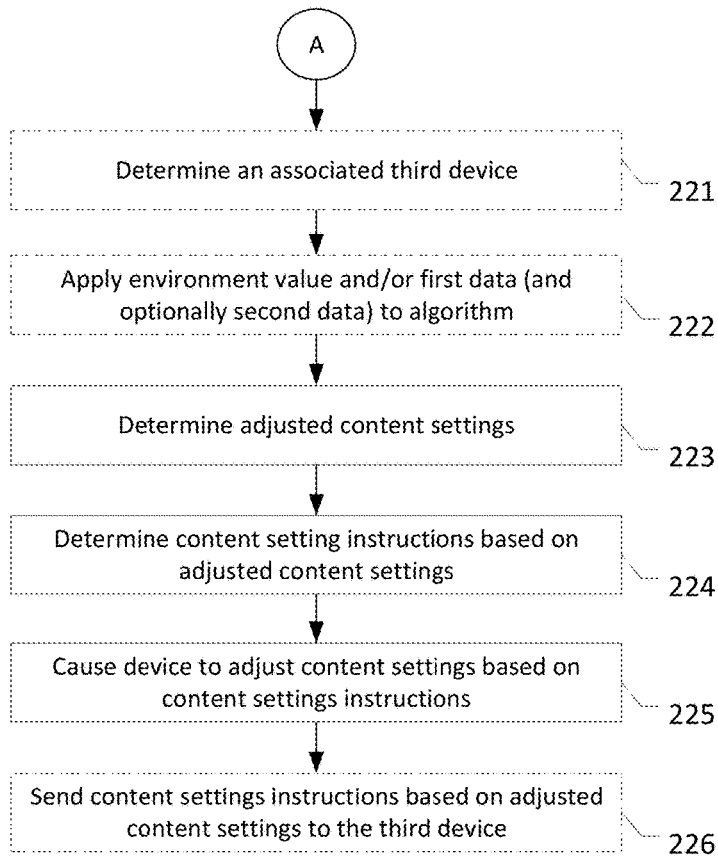

Referring now to FIG. 2B, an example process flow for determining adjusted content is depicted in accordance with one or more example embodiments of the disclosure. FIG. 2B may begin with point A, which is the same point A of FIG. 2A. At block 221, computer-executable instructions stored on a memory of a device, such as an electronic device and/or server, may be executed to determine a third electronic device. The third electronic device may be paired with the electronic device running the algorithm (e.g., first electronic device). The third electronic device may present, play, or otherwise broadcast media content. For example, the third electronic device may be a speaker (e.g., a sound bar) or a subwoofer.

At optional block 222, computer-executable instructions stored on a memory of a device, such as an electronic device and/or server, may be executed to apply the environment value determined based on the input data, the first input data and/or the second input data to an algorithm for determining adjusted content settings. As explained above, the algorithm may be designed or trained to determine content settings that are appropriate for a certain environment value or appropriate for certain input data. At block 223, adjusted content settings may be determined from the algorithm. Alternatively, the environment value based on the input data, the first input data, and/or the second input data may be applied to database to determine an associated content settings entry corresponding to appropriate content settings for the environment value and/or the input data. In one example, the environment value and input data may correspond to a nighttime environment and the appropriate content settings may involve reduced brightness levels on the display, reduced volume on a speaker, and/or a limited dynamic range.

At optional block 224, computer-executable instructions stored on a memory of a device, such as an electronic device and/or server, may be executed to determine content setting instructions based on the adjusted content settings. For example, the application may determine commands and/or instructions for other electronic devices playing, presenting, and/or broadcasting the media content to inform the other electronic devices of the adjusted content settings for playing, presenting, and/or broadcasting the media content. Additionally, or alternatively, the adjusted content setting instructions may be intended for the device running the application and/or an application that manages content settings on the device running the application.

At block 225, computer-executable instructions stored on a memory of a device, such as an electronic device and/or server, may be executed to cause the electronic device running the application to adjust the content settings for playing, presenting, and/or broadcasting the media content based on the instructions. This may include causing the electronic device to adjust the content settings or may involve instructing the second application managing the content settings of the electronic device to adjust the content settings according to the adjusted content settings.

At optional block 226, computer-executable instructions stored on a memory of a device, such as an electronic device and/or server, may be executed to send the content settings instructions to the third device. For example, the electronic device running the application may be paired and/or in communication with the third device and may send the content settings instructions to the third device. Alternatively, the electronic device running the application may communicate the adjusted content settings instructions to the third device via the server or via a connected device in communication with the electronic device running the application.

Figure 2C:
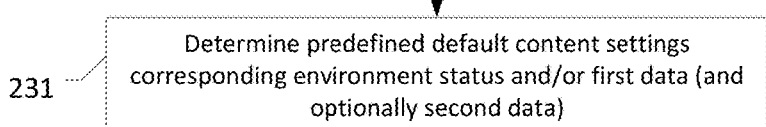

Referring now to FIG. 2C, an example process flow for determining predefined content settings is depicted in accordance with one or more example embodiments of the disclosure. FIG. 2C may begin with point A, which is the same point A of FIG. 2A. At block 231, computer-executable instructions stored on a memory of a device, such as an electronic device and/or server, may be executed to determine predefined default content settings corresponding to the environment value, first data, and/or second data. For example, the environment value, first data, and/or second data may be applied to an algorithm for determining predefined default content settings. The algorithm may be designed or trained to determine predefined default content settings that are appropriate for a certain environment value or appropriate for certain input data. In another example, the environment value based on the input data, the first input data, and/or the second input data may be applied to a database to determine predefined default content settings appropriate for the environment value determined and/or the input data. As explained above, predefined default content settings may be determined by a brand and/or manufacturer, may be unique to a device (e.g., television model or display model) and/or may be standardized industry settings (e.g., filmmaker mode defined by UHDA). Other predefined default content settings may include nighttime mode, sports mode, high definition mode and any other well-known predefined default content settings.

At block 232, computer-executable instructions stored on a memory of a device, such as an electronic device and/or server, may be executed to cause the predefined default content settings to be selected. For example, upon determining the predefined default content setting at block 231, the application running on the device may cause the electronic device running the application to adjust to select the predefined default content settings. Alternatively, the application may generate instructions for a second application that manages the predefined default content settings to select the predefined default content settings and may send the instructions to the second application to cause the predefined default content setting to be selected.

Figure 2D:
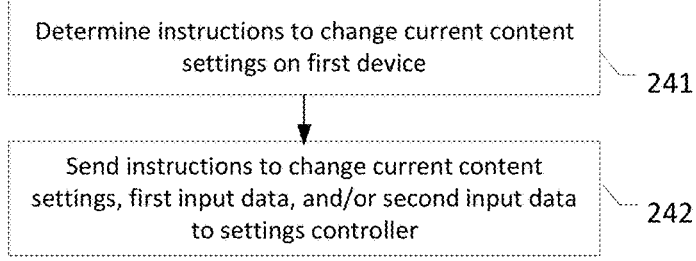

Referring now to FIG. 2D, an example process flow for sending instructions to change the current content settings along with an environment value and/or input data is depicted in accordance with one or more example embodiments of the disclosure. FIG. 2D may begin with point A, which is the same point A of FIG. 2A. At block 241, computer-executable instructions stored on a memory of a device, such as an electronic device and/or server, may be executed to determine instructions to change current content settings. For example, based on the determination that the current content settings should be adjusted at decision 206 of FIG. 2A, the application running on the electronic device may generate a message, command, metadata, and/or other instructions to instruct the device to change current content settings on the device. The instructions may be intended for a second application (e.g., settings controller) running on the device that may determine the appropriate settings for the surrounding environment. The instructions may further include information about the environment value, the first data, and/or the second data.

At block 242, computer-executable instructions stored on a memory of a device, such as an electronic device and/or server, may be executed to send the instructions to change the current content settings to the second application (e.g., settings controller) running on the device also running the application. Additionally, or alternatively, input data determined and/or obtained by the application may be sent to the second application. The second application may perform steps similar to those illustrated in FIG. 2B (e.g., blocks 223-226) to determine adjusted content settings.

Figure 3:
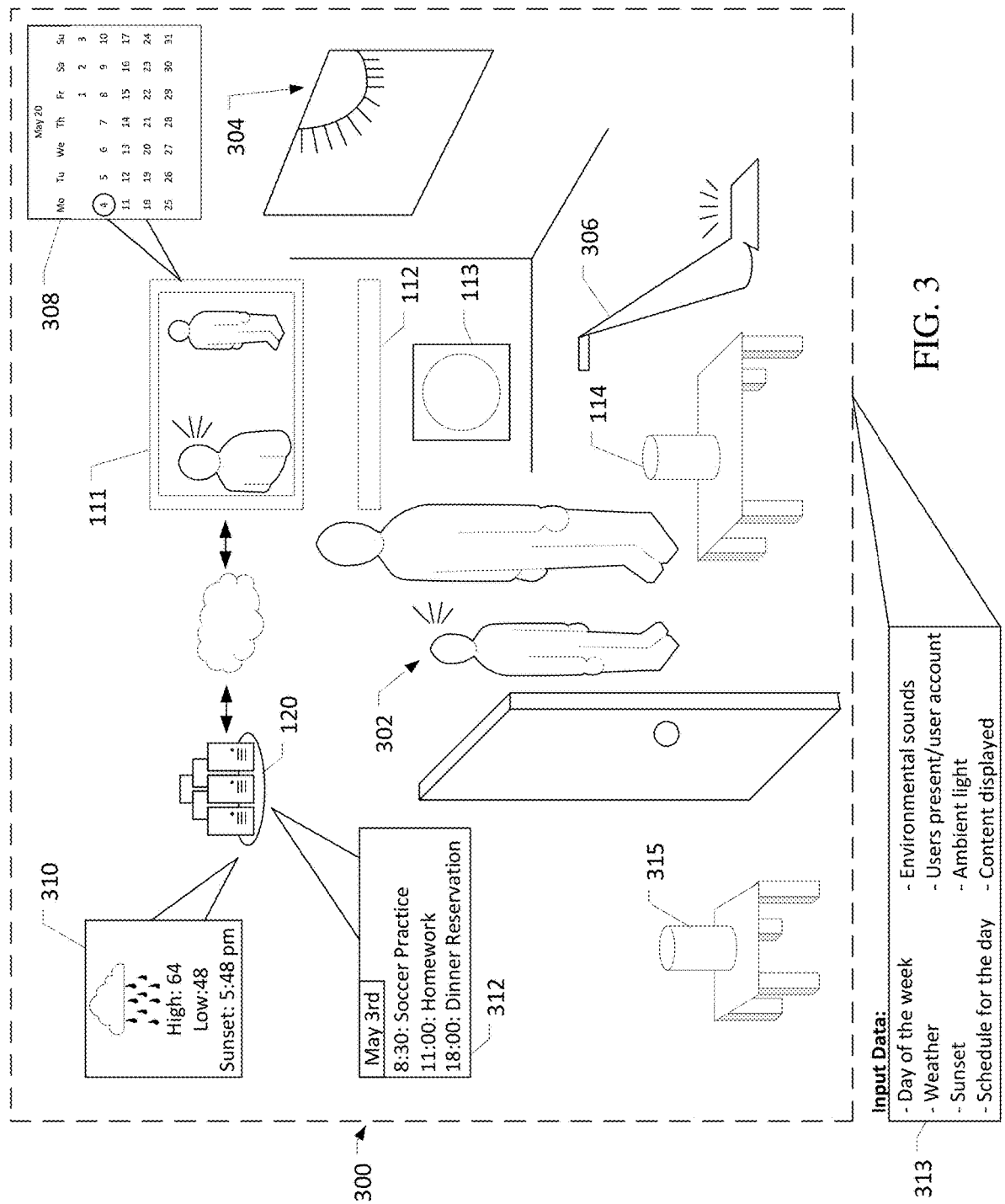
FIG. 3 is a schematic illustration of an example use case for determining adjusted content settings based on various input data in accordance with one or more example embodiments of the disclosure.

Referring to FIG. 3, an example use case 300 for determining adjusted content settings based on a variety of input data is depicted in accordance with one or more example embodiments of the disclosure. In the illustrated example, similar to FIG. 1, an electronic device (e.g., electronic device 111) may run and/or access an application that may determine input data and/or receive input data from other electronic devices (e.g., electronic devices 112, 113, and 114) and/or server 120. Based on the input data, the application may determine that an environment condition has changed or will change and, based on the input data, the application may alter content settings for playing, broadcasting and/or presenting media content on the electronic devices or otherwise cause such content settings to be adjusted.

In the example illustrated in FIG. 3, like in FIG. 1, electronic device 111 is a television (e.g., smart television with a processor), electronic device 112 is a speaker (e.g., sound bar), electronic device 113 is a subwoofer, and electronic device 114 is a connected device. Electronic device 111 may be in communication with one or more servers and/or other electronic devices, via any well-known wired or wireless system (e.g., Wi-Fi, cellular network, Bluetooth, Bluetooth Low Energy (BLE), near field communication protocol, etc.). As explained above, electronic device 114 may be a connected device that is connected to the cloud and/or Internet (e.g., via Wi-Fi or a cellular network), may communicate with electronic device 111 and may further be in communication with one or more other electronic devices (e.g., via Bluetooth or Wi-Fi Direct). In addition electronic device 315 may also be included in use case 300 and may be similar to electronic device 114 but located in a different room (e.g., a bedroom). Electronic device 315 may be in communication with electronic device 114 and/or electronic device 111 via any well-known wired or wireless system (e.g., Wi-Fi, cellular network, Bluetooth, Bluetooth Low Energy (BLE), near field communication protocol, etc.). Electronic device 114 may be connected to the cloud and/or Internet (e.g., via Wi-Fi or a cellular network) and may communicate with a server. In one example, electronic device 114 and/or electronic device 315 may be a smart home hub, smart speaker, or other wirelessly connected device or smart device (e.g., smart lights).

It is further understood that electronic devices may be any other electronic device (e.g., tablet, e-reader, wearable device, connected device, desktop computer, laptop computer, one or more servers, or the like) or one or more of each device may be included. In another example, only electronic device 111 may be in communication with a server. In yet another example, fewer or additional electronic devices may be included in use case 300. For example, additional speakers, displays (e.g., televisions), and/or connected devices may be included in use case 300.

As shown in FIG. 3, electronic device may present media content via a display and/or speakers incorporated into electronic device 111. Further electronic device 111 may coordinate with electronic device 112 to play media content via speakers of electronic device 112 and may coordinate with electronic device 113 to produce low-pitched audio frequencies known as bass via one or more subwoofers. Electronic device 111 may further communicate with a server, electronic device 114, and/or electronic device 315 to obtain input data.

Electronic devices 111, 112, 113, 114, and/or 315 may generate, obtain and/or determine various types of input data (assuming certain privacy measures are implemented to ensure compliance with regulations and user preferences) or may communicate with a server to determine various types of input data. For example, electronic devices may include a camera and/or a light sensor. In one example electronic device 111, electronic device 114, and/or electronic device 315 may include a camera and/or light sensor. Ambient light may be sensed using the light sensor. Alternatively, the camera may be used to take an image of the surrounding environment and from the image the ambient light in the environment may be determined. For example, electronic device 114 take an image of the environment and may send the image to the application to determine high brightness levels based on the sunlight 304 coming through a window. Alternatively, the ambient light may be determined from the image by electronic device 114. It is understood that the application may optionally account for the brightness levels generated by a display if this information is known by the electronic device or may be accessed from server 120. For example, the application may know that an increase or decrease in brightness levels is caused by the display and thus may disregard or otherwise account for input data based on such increase or decrease. Similarly, the application may optionally account for the audio levels generated by a device (e.g., television, sound system, subwoofer) if this information is known or may be accessed from server 120. For example, the application may know that an increase or decrease in audio levels is caused by the display and thus may disregard or otherwise account for input data based on such increase or decrease. Additionally, using the image of the surrounding environment, facial recognition technology may be used to determine individuals present in the surrounding environment. For example, individuals 302 may be present near electronic device 114. The application may determine that the individual in the environment is associated with a user account registered to the application. Based on the determination that an individual present is associated with a user account, certain user preferences associated with that account may be identified (e.g., preference for high brightness levels or preference for closed captioning). Further the location of a user within a residence (e.g., in a bedroom) may be determined. For example, electronic device 315 may be located in a bedroom and may send input data to the application to inform the application that a child is in the bedroom. Based on this input data, a nighttime mode may be initiated on electronic device 112 to lower the volume of the speakers.

Additionally, or alternatively, electronic devices may include a microphone and/or audio sensor. For example, electronic device 111, electronic device 112, electronic device 113, electronic device 114 and/or electronic device 315 may include a microphone and/or audio sensor. The electronic devices may use the microphone to capture noises in the environment surrounding the electronic devices such as ambient noises, voices, background noise, and the like. For example, an electronic device may generate, determine and/or obtain input data in the form of ambient noise and/or background noise levels to determine how loud the surrounding environment is. This input data may be used by the application to increase volume levels to permit individuals to hear the media content display, broadcast and/or played on the electronic devices. In one example, electronic device 114 may capture noise from a vacuum 306 and/or any other appliance (e.g., blender or dishwasher). The application may receive this input data and based on the input data may increase the volume broadcast on electronic device 112 to improve the viewing experience for the individuals in the room. In another example, if the background noise reaches a certain threshold, the application may send a command to a content player and/or otherwise cause a content player to pause the media content until the background noise is below the certain threshold. Additionally, or alternatively, electronic devices include a microphone and/or audio sensor that may capture input data indicative of a voice of an individual in the surrounding environment. The application may determine that the individual in the environment is associated with a user account registered to the application. Based on the determination that an individual present is associated with a certain user account, certain user preferences may be identified (e.g., preference for high brightness levels or preference for closed captioning). In another example, based on the determination that an individual is present, certain content settings (e.g., parental content settings) may be activated. For example, the application may send a command to a content player and/or otherwise cause a content player to pause the media content and/or to play an edited and/or non-explicit version of the media content data. Further, the location of a user within a residence (e.g., in a bedroom) may be determined. For example, electronic device 315 may be located in a bedroom and may send input data to the application to inform the application that a child is in the bedroom. Based on this input data, a nighttime mode may be initiated on electronic device 112 to lower the volume of the speakers.

Additionally, or alternatively, electronic devices may access input data stored on electronic devices that are connected devices (e.g., electronic device 114 and/or electronic device 315) and/or server 120. In one example, electronic devices may determine input data based on information stored in memory or determined by a processor running on that electronic device. For example, an electronic device may determine the date and/or time based on an internal calendar (e.g., calendar information 308). Based on this input data, the application may initiate settings appropriate for a time and/or date. For example, if it is determined that the time is 9:30 pm on a Monday in September, the application may determine that it is a school night and the children that live in the home are likely asleep. Accordingly, the application may lower brightness levels, lower volume levels and/or adjust the dynamic range. Alternatively, or in addition, electronic devices may communicate with the server 120 to determine the time and/or date. Further, the server 120 may store and/or have access to a variety of other information. For example, the server may store information about a schedule associated with a user account associated with the application and/or electronic devices. For example, the server 120 may access schedule information 312 to provide input data about the date and the schedule and/or agenda of a user associated with a user account. In one example, the schedule may provide information about the date being May $3^{rd}$, and about soccer practice at 8:30, homework at 11:00 and dinner reservations at 18:00. Schedule information 312 may further include commands to adjust content settings at certain times and/or dates. The application may alter the content settings based on this input data. For example, at 11:00 the volume broadcast may be reduced or muted as this time is associated with a scheduled time for homework. In another example, schedule information 312 may include a command at 9:00 pm on week days to decrease the volume on the television to a certain level.

The server 120 may further access weather information 310 such as the location of the sun with respect to the location of the electronic devices, the current cloud coverage, weather forecasts, and/or information about sunset and/or sunrise. Weather information 310 may optionally include lunar information about the phase of the moon and the brightness from the moon. Based on the input data corresponding to weather information 310, application may determine that it is nighttime and/or cloudy outside and based on this information, may adjust the content settings (e.g., lower the brightness levels).

The server 120 may have access to any other types of information that may be used as input data to assist application in adjusting the content settings. For example, server 120 may determine and/or obtain information about the type of media content being displayed, played, and/or otherwise broadcast on electronic devices 110. In one example, the server 120 may send input data to the application to inform the application that the media content is sports content, an action movie, or a cartoon, for example. Depending on the type of media content, the application may alter the content settings. For example, the optimal display and/or audio settings for a cartoon, baseball game, and/or action movie may be significantly different. In one example, clarity may be more important for a baseball game than a cartoon. In another example the dynamic range of the audio output may be different for a cartoon versus an action film with explosions.

As shown in FIG. 3, the types of input data 313 may include the day of the week, weather, sunset time, the schedule for the day, environmental sounds, users present, ambient light and/or content display. It is understood, however, that types of input data 313 is exemplary and that any other input data may be determined by electronic devices 111, 112, 113, 114, 315 and/or server 120. For example, the application and/or server 120 may maintain an archive of input data and/or content settings and may detect trends in the input data and/or content settings that may be used to adjust content settings. While one type of input data may be sufficient to adjust content settings, it is understood that more than one type of input data may be considered when determining whether to adjust content data. For example, the application may consider calendar information 308, schedule information 312, and input data indicative of the presence of users in a room to determine whether to decrease volume levels (e.g., if it is determined that it is 11:00 pm on a school night and the children are in their rooms). In one example, connected device 315 may identify a user in the office of the residence at 11:00 am and determine that based on the schedule and date, it is time for homework and thus the volume should be decreased.

Figure 4:
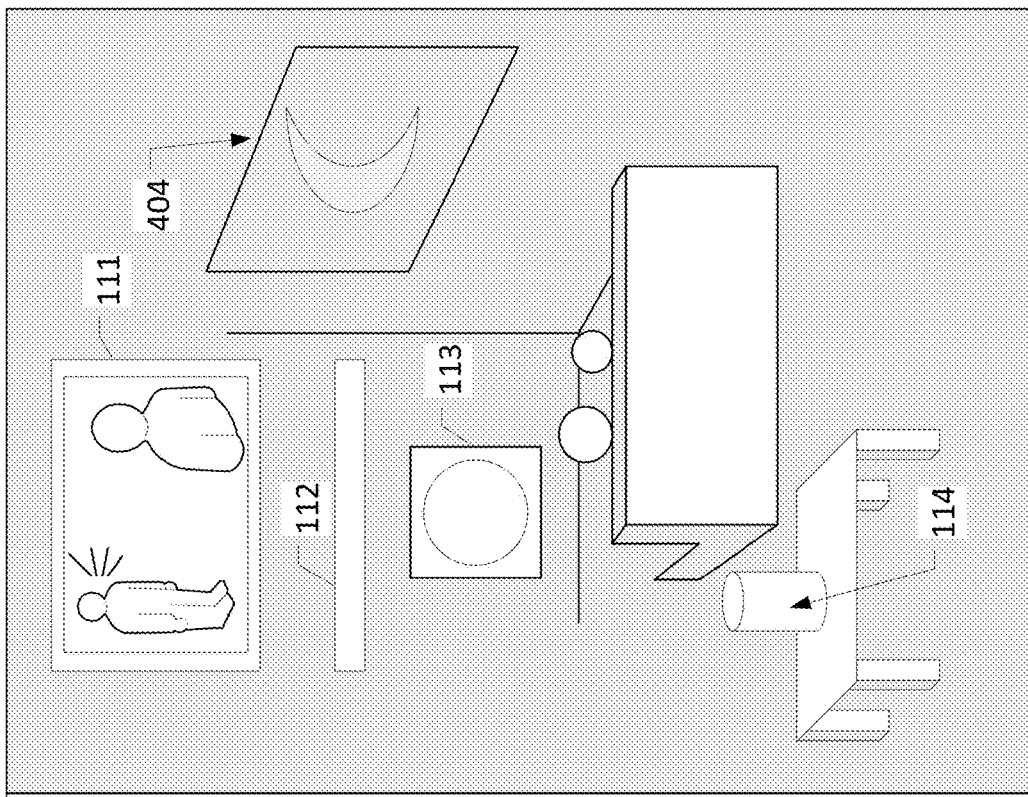
FIG. 4 is a schematic illustration of an example use case for determining transition content settings based on an impending change in the environment in accordance with one or more example embodiments of the disclosure.
Figure 4:
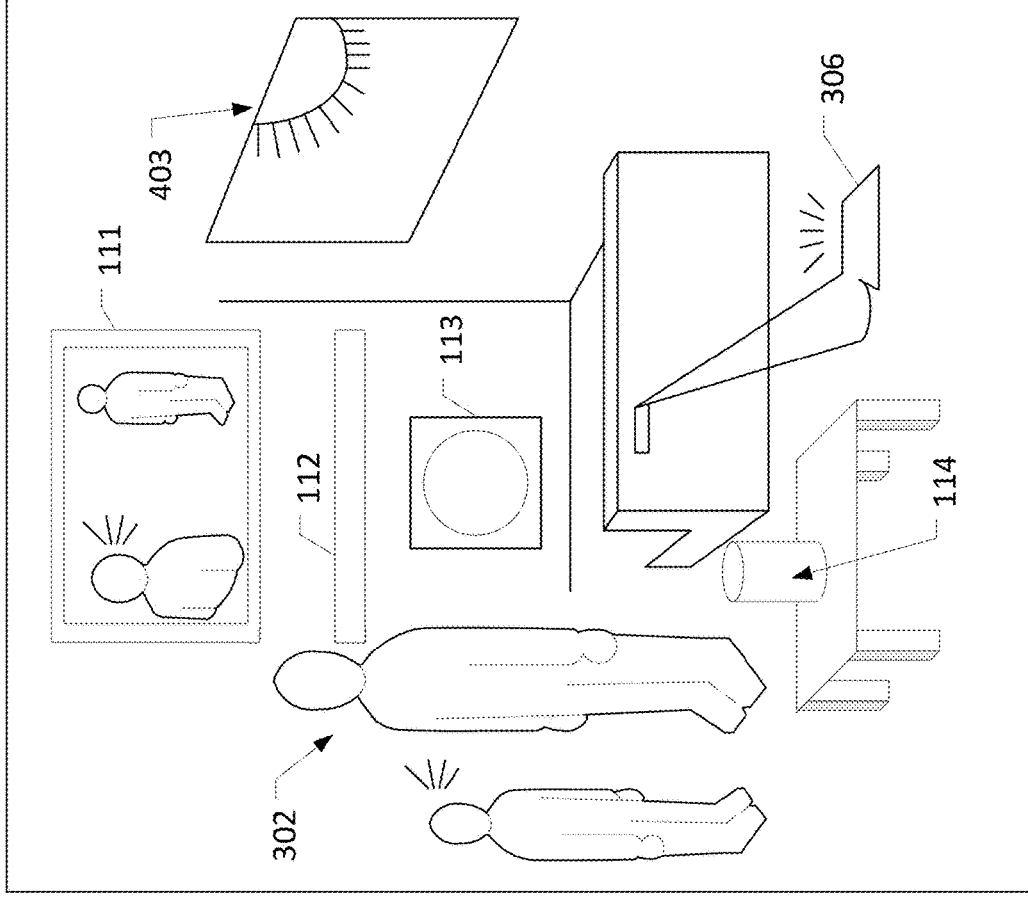

Referring to FIG. 4, an example use case 400 for determining transition content settings based on an impending change is depicted in accordance with one or more example embodiments of the disclosure. In the illustrated example, similar to FIG. 1, an electronic device (e.g., electronic device 111) may run and/or access an application that may determine input data and/or receive input data from other electronic devices (e.g., electronic devices 112, 113, and 114) and/or server 120 (not shown). Based on the input data, the application may determine that an environment condition has changed or will change and, based on the input data, the application may alter content settings for displaying and/or presenting media content on the electronic devices 110 or otherwise cause such content settings to be adjusted.

As shown in FIG. 4, environment 401 is a daytime environment with sunlight 403 entering the environment through a window. Additionally, environment 402 is a nighttime environment with only moonlight 404 entering through a window. Input data may be generated or determined in environment 401 to detect the sunlight 403. For example, a light sensor on electronic device 114 may detect sunlight 403. Further, an audio sensor on electronic device 114 may detect background noise from vacuum 306 as well as background noise from individuals 302 in environment 401. Based on input data corresponding to time information, the application may determine its day time and may further determine the appropriate content settings based on this input data indicative of the sunlight 403, background noise from the individuals 302 and the appliance noise from the vacuum 306.

The environment 402 may be significantly different from environment 401 in that the sun has set and thus moonlight 404 and not sunlight 403 enters through the window. Further noises in the environment may subside during nighttime. For example, environment 402 may no longer have noise from vacuum 306 and/or individuals 302. The content settings appropriate for environment 402 thus too may be significantly different than those appropriate for environment 401.

To avoid abrupt and/or extreme changes in the content settings, the application may gradually change content settings between environment 401 and environment 402. For example, application may receive input data indicative of weather information, as explained above with respect to FIG. 3. The weather information may inform application of the sunset time. Based on the sunset time, the application may determine that a change in the environment is impending and thus may determine transition content settings to gradually change the content settings as the environment changes (e.g., as the sun sets). For example, the application may determine the amount of time until the sun sets and determine content settings for time points between the current time and the sunset time to gradually transition from content settings appropriate for a first environment (e.g., environment 401) to content settings appropriate for a second environment (e.g., environment 402). For example, as sunset approaches, the volume and brightness levels may be gradually decreased between the current time and the sunset time such that the appropriate content settings for the second environment are achieved by the time of sunset.

Figure 5:
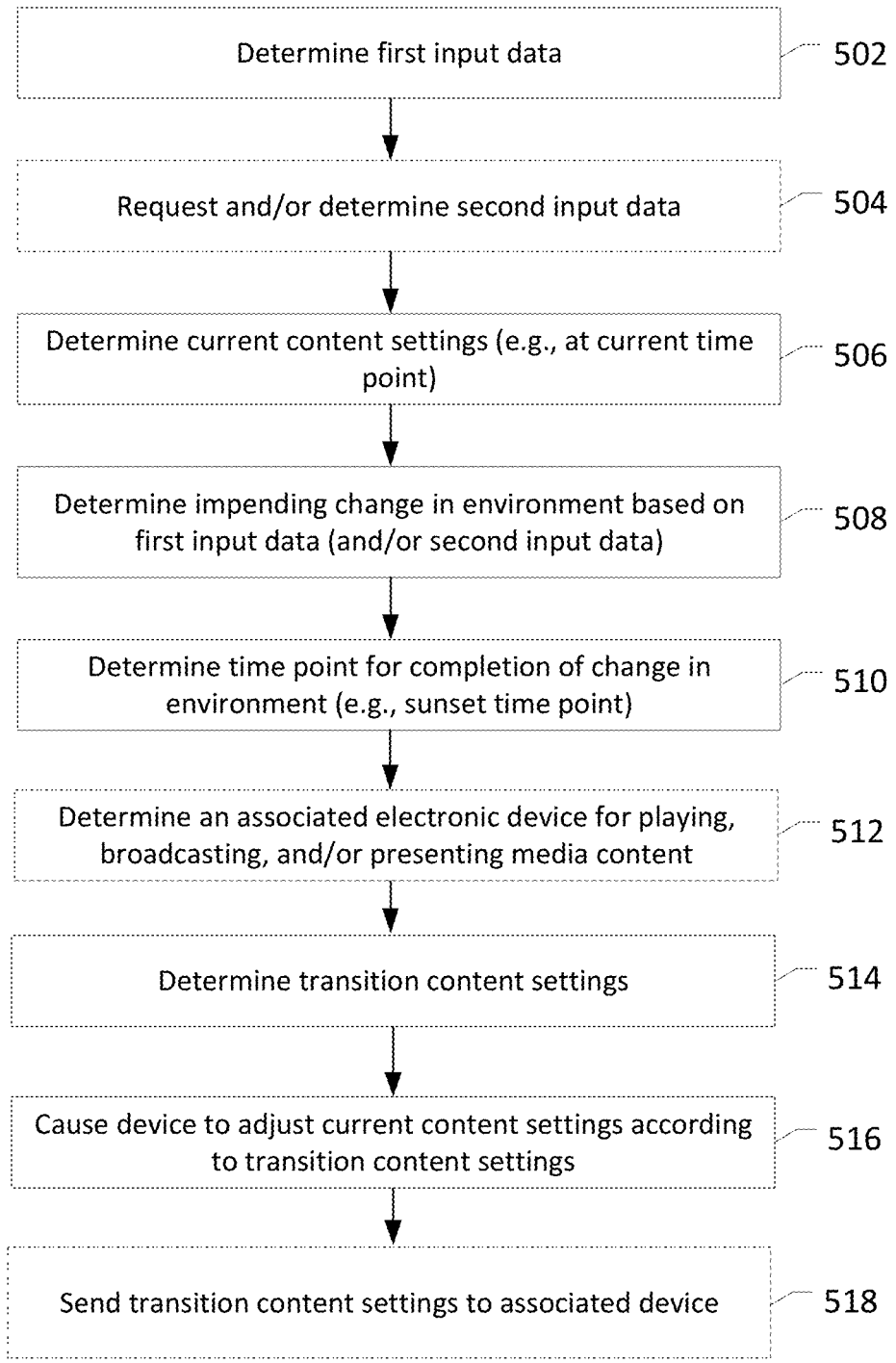
FIG. 5 is a schematic illustration of an example process flow for determining transition content settings based on an impending change in the environment in accordance with one or more example embodiments of the disclosure.

Referring now to FIG. 5, an example process flow for determining transition content settings is depicted in accordance with one or more example embodiments of the disclosure. Some or all of the blocks of the process flows in this disclosure may be performed in a distributed manner across any number of devices. Some or all of the operations of the process flow may be optional and may be performed in a different order.

At block 502, computer-executable instructions stored on a memory of a device, such as an electronic device and/or server, may be executed to determine a first type of input data. For example, the application may determine the time, the date, the content or type of content played on an electronic device, and any other information available to the application on the electronic device and/or the server. In one example, a television running the application may determine the time in the time zone of the television.

At optional block 504, computer-executable instructions stored on a memory of a device, such as an electronic device and/or server, may be executed to request and/or determine second input data. For example, the application may request a second type of input data from a second device. In one example, the application may request that a connected device having a camera or light sensor send the application input data corresponding to the ambient light in the environment surrounding the connected device. Other types of input data that the application may request from other electronic devices include, for example, voice input data, sound input data, schedule input data, weather input data, and any other type of information and/or data that could be collected from the surrounding environment using a camera, microphone, sensor and/or any hardware or software for collecting input data. Alternatively, the electronic device running the application may instruct a connected device or even a server in communication with another electronic device to request the input data. The other electronic device may send the requested input data to the electronic device running the application in the same manner.

At block 506, computer-executable instructions stored on a memory of a device, such as an electronic device and/or server, may be executed to determine the current content settings. The application running on the electronic device and/or server may manage the current content settings and thus may know the current content settings at any given time. Alternatively, the application may be in communication with a second application running on the same electronic device, the server, and/or another electronic device that is responsible for managing and/or selecting the content settings. The application may request and receive information about the current content settings from the second application. As explained above, the content settings may involve audio and/or visual content settings and/or predefined default content settings.

At block 508, computer-executable instructions stored on a memory of a device, such as an electronic device and/or server, may be executed to determine an impending change in the environment surrounding the electronic devices based on the first input data and/or the second input data. For example, the first input data may be the time of day in location of the electronic devices. Further, the second input data may be the projected time for sunset in the location of the electronic device. Based on the time of day and the projected time for sunset, the application may determine that the sun will be setting soon (e.g. in one hour, two hours, thirty minutes etc.) and thus may determine that there is an impending change in the environment as the environment will transitioning from a daytime environment (e.g., environment 401) to a nighttime environment (e.g., environment 402).

At block 510, computer-executable instructions stored on a memory of a device, such as an electronic device and/or server, may be executed to determine a time point for completion of change in the environment. For example, the application may determine that the time point for completion is the sunset time. Alternatively, the application may be programmed to add thirty minutes to sunset time to account for residual light after the sunset time. The time point of completion may be the time point for which the selected content settings are appropriate for the new environment (e.g., nighttime environment).

At optional block 512, computer-executable instructions stored on a memory of a device, such as an electronic device and/or server, may be executed to determine another electronic device, other than the electronic device running the application, for playing, broadcasting and/or presenting the media content. The other electronic device may be paired (e.g., Bluetooth) with the electronic device running the application and/or both electronic devices may be associated with the same user account.

At block 514 computer-executable instructions stored on a memory of a device, such as an electronic device and/or server, may be executed to determine transition content settings for time points between current time point and final time point corresponding to the time point for completion of change in the environment, with each transition content setting corresponding to a time point between the current time point and final time point. For example, the application may determine the impending change at block 508 and based on the impending change, determine content settings appropriate for a projected environment at the completion of the impending change. In one example, the projected environment may be an environment which is dark and/or corresponds to nighttime. Archived content settings at this time from another day may be used to determine the appropriate content settings at the completion of the change in the environment. Alternatively, content settings may be determined in a manner similar to that described above with respect to block 223 of FIG. 2B. Transition content settings may be determined by gradually transitioning the content settings between the current content settings and the content settings for the completed environment change. This may involve using a default number of changes (e.g., 5, 10, 15, 20, etc.) between the current time and the completed time points. For example, if the current time is 16:30 and the completed time is 17:30, transition content settings may be determined at time points between this time period (e.g., every six minutes). In this example, if the current brightness level is 10 and the brightness level at the completion of the change in environment should be 4, the brightness level may be decreased by one unit every six minutes. It is understood that the change may be linear (e.g. one unit per every six minutes) or non-linear (e.g., 0.5 units at 6 minutes and 1.5 units at 12 minutes). The transition content settings may be specific to one electronic device and/or may be relevant and/or specific to other electronic devices.

At block 516, computer-executable instructions stored on a memory of a device, such as an electronic device and/or server, may be executed to cause the electronic device running the application to adjust the content settings for playing, presenting, and/or broadcasting the media content. This may include causing the electronic device to adjust the content settings or may involve instructing the second application managing the content settings of the electronic device to adjust the content settings according to the transition content settings.

At optional block 518, computer-executable instructions stored on a memory of a device, such as an electronic device and/or server, may be executed to cause the electronic device running the application to send transition content settings, or a portion thereof relevant to the associated device determined at block 512, to the electronic device to cause the electronic device to play, broadcast, and/or present the media content according to the transition content settings. It is understood that the transition content settings may be adjusted as the environment changes. For example, if lights are turned on or off while the application is causing the device and/or associated device to apply the transition content settings, the transition content settings may be adjusted at any time by repeating steps 502-516 and applying the adjusted transition content settings to the device and/or associated device.

Illustrative Device Architecture

Figure 6:
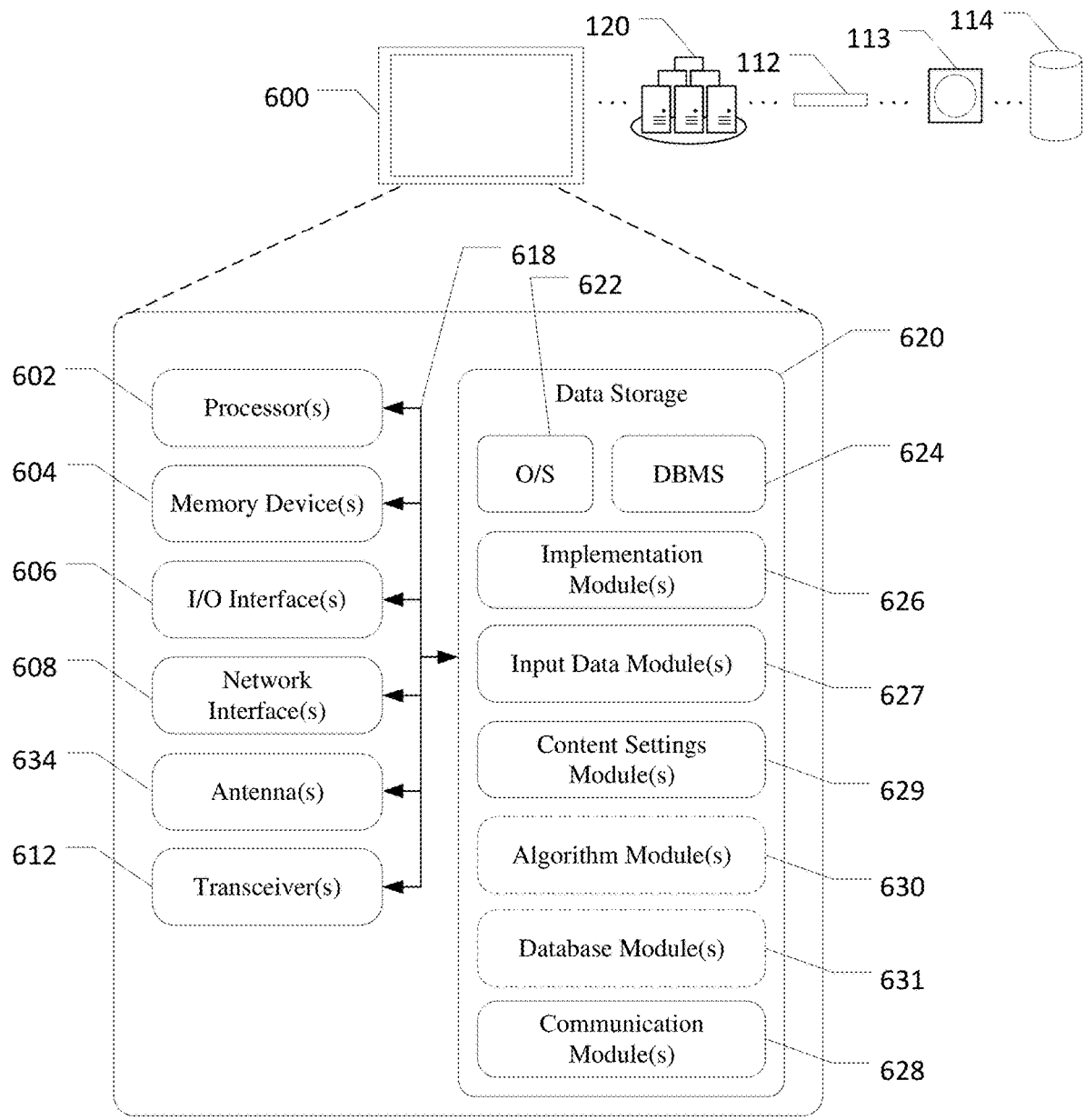
FIG. 6 is a schematic block diagram of an electronic device in accordance with one or more example embodiments of the disclosure.

FIG. 6 is a schematic block diagram of an illustrative electronic device 600 in accordance with one or more example embodiments of the disclosure. The electronic device 600 may include any suitable computing device capable of receiving and/or sending data, and may optionally be coupled to devices including, but not limited to, electronic devices such as speakers, subwoofers, displays, connected devices, displays, televisions, tablets, e-readers; one or more user devices (e.g., wearable devices and/or smart sensors); a desktop computer; a laptop computer; one or more servers; datastores; or the like. The electronic device 600 may correspond to an illustrative electronic device configuration of electronic device 110 and any other electronic devices of FIGS. 1-5. Electronic device 600 may be in communication with server 120, electronic device 112, electronic device 113, or electronic device 114, for example.

The electronic device 600 may be configured to communicate via one or more networks with one or more servers, electronic devices, user devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device 600 may include one or more processors (processor(s)) 602, one or more memory devices 604 (generically referred to herein as memory 604), one or more of the optional input/output (I/O) interface(s) 606, one or more network interface(s) 608, one or more transceivers 612, and one or more antenna(s) 634. The electronic device 600 may further include one or more buses 618 that functionally couple various components of the electronic device 600. The electronic device 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the electronic device 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the electronic device 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more implementation module(s) 626, one or more input data module(s) 627, one or more communication module(s) 628, one or more content settings module(s) 629, one or more optional algorithm module(s) 630, and/or one or more optional database module(s) 631. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the electronic device 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the electronic device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the implementation module(s) 626 may include computer-executable instructions, code, or the like that responsive to execution by one or more of the processor(s) 602 may perform functions including, but not limited to, overseeing coordination and interaction between one or more modules and computer executable instructions in data storage 620, determining user selected actions and tasks, determining actions associated with user interactions, determining actions associated with user input, and the like.

The input data module(s) 627 may include computer-executable instructions, code, or the like that responsive to execution by one or more of the processor(s) 602 may perform functions including, but not limited to, determining input data based on information archived and/or available on electronic device 600. Input module(s) may further determine input data by accessing input data from server 120 and/or by requesting input data and receiving input data from one or more electronic devices in communication with electronic device 600.

The communication module(s) 628 may include computer-executable instructions, code, or the like that responsive to execution by one or more of the processor(s) 602 may perform functions including, but not limited to, communicating with one or more devices, for example, via wired or wireless communication, communicating with electronic devices, communicating with one or more servers (e.g., remote servers), communicating with remote datastores and/or databases, sending or receiving notifications or commands/directives, communicating with cache memory data, and the like.

The content settings module(s) 629 may include computer-executable instructions, code, or the like that responsive to execution by one or more of the processor(s) 602 may perform functions including, but not limited to, determining content settings for electronic device 600 and/or other electronic devices. Content settings module(s) 629 may further determine adjusted content settings, transition content settings, and/or current content settings. Further, content settings module(s) may determine default content settings. Content settings module(s) 629 may communicate with one or more other applications to cause an electronic device to set, adjust and/or modify content settings.

The optional algorithm module(s) 630 may include computer-executable instructions, code, or the like that responsive to execution by one or more of the processor(s) 602 may perform functions including, but not limited to, receiving environment value and/or input data and applying the forgoing to one or more algorithms to determine content settings. In one example, the one or more algorithms may be designed to produce a value or set of values that may be applied to a database to determine content settings and/or a corresponding environment value.

The database module(s) 631 may include computer-executable instructions, code, or the like that responsive to execution by one or more of the processor(s) 602 may perform functions including, but not limited to, determining whether content settings should be adjusted based on a database. An environment value database may include several different environment values that correspond to different input data values. Input data may be applied to the database to determine that a certain environment value entry in the database is relevant to the input data. Alternatively, or in addition, values from the algorithm module based on input data and/or environment values may be applied to the database to determine an environment value.

Referring now to other illustrative components depicted as being stored in the data storage 620, the O/S 622 may be loaded from the data storage 620 into the memory 604 and may provide an interface between other application software executing on the electronic device 600 and hardware resources of the electronic device 600. More specifically, the O/S 622 may include a set of computer-executable instructions for managing hardware resources of the electronic device 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the electronic device 600, the optional input/output (I/O) interface(s) 606 may facilitate the receipt of input information by the electronic device 600 from one or more I/O devices as well as the output of information from the electronic device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a light sensor; an audio sensor; and so forth. Any of these components may be integrated into the electronic device 600 or may be separate. The I/O devices may further include, for example, any number of peripheral devices such as data storage devices, printing devices, and so forth.

The optional I/O interface(s) 606 may also include an interface for an external peripheral device connection such as universal serial bus (USB), FireWire, Thunderbolt, Ethernet port or other connection protocol that may connect to one or more networks. The optional I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The electronic device 600 may further include one or more network interface(s) 608 via which the electronic device 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna(e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a Bluetooth antenna configured to transmit or receive signals in accordance with established standards and protocols, such as Bluetooth and/or BLE. Alternatively, or in addition to, antenna(e) 634 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum (e.g., 900 MHz).

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the electronic device 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the electronic device 600. The transceiver(s) 612 may further include a low noise amplifier (LNA), additional signal amplifiers, an analog-to-digital (A/D) converter, one or more buffers, a digital baseband, or the like.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device 600 and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the electronic device 600 may include alternate and/or additional hardware, software, or firmware components beyond those described or depicted without departing from the scope of the disclosure. More particularly, it should be appreciated that software, firmware, or hardware components depicted as forming part of the electronic device 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms (e.g., electronic device 600 and/or server 120). The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:
1. A method comprising:
    determining, by a first application running on a first device, first input data corresponding to a current time point;

requesting, by the first application running on the first device, second input data from a second a second device, the second input data indicative of an ambient light value;

receiving, by the first application running on the first device, the second input data from the second device;

determining, by the first application running on the first device, an environment value based on the first input data and the second input data, the environment value indicative of an environment corresponding to the first device;

determining, by the first application running on the first device, current playback settings indicative of parameters selected for presenting content data on the first device, the current playback settings corresponding to one or more of a brightness setting and a volume setting on the first device;

determining, by the first application running on the first device, that the current playback settings do not correspond to the environment value;

determining, by the first application running on the first device, a third device associated with the first device;

applying, by the first application running on the first device, the first input data and the second input data to an algorithm to determine first adjusted playback settings and second adjusted playback settings, the first adjusted playback settings corresponding to a brightness setting and the second adjusted playback settings corresponding to a volume setting;

causing, by the first application running on the first device, the first adjusted playback settings to be applied to the first device; and sending, by the first application running on the first device, the second adjusted playback settings to the third device, wherein the first adjusted playback settings and the second adjusted playback settings change a presentation of the content data on the first device and third device, respectively.

2. The method of claim 1, further comprising:
determining third input data corresponding to a sunset time point at a location of the first device;
determining an impending change in the environment value based on the first input data and the third input data; and
determining transition playback settings for time points between the current time point and the sunset time point, each transition playback setting corresponding to a time point between the current time point and the sunset time point.

3. The method of claim 1, further comprising:
determining a database of environment values and playback settings; and
determining an entry in the database of environment values and playback settings corresponding to the current playback settings.

4. The method of claim 1, wherein the environment value is indicative of a nighttime environment, the first adjusted playback setting is indicative of a reduced brightness setting, and the second adjusted playback setting is indicative of a reduced volume setting.

5. The method of claim 1, wherein the algorithm is specific to a display model corresponding to the first device and a speaker model corresponding to the third device.

6. A method comprising:
determining, by a first application running on a first device, first input data;

requesting, by the first application running on the first device, second input data from a second device;
receiving, by the first application running on the first device, second input data from the second device;
determining, by the first application running on the first device, current content settings indicative of parameters selected for presenting content data on the first device, the current content settings corresponding to one or more of a brightness setting and a volume setting on the first device;
determining, by the first application running on the first device, that current content settings should be adjusted based on the first input data and second input data; and
causing, by the first application running on the first device, the current content settings on the first device to be adjusted based on the first input data and the second input data,
wherein adjusting the current content settings changes a presentation of the content data on the first device.

7. The method of claim 6, further comprising:
determining adjusted content settings based on the first input data and second input data;
determining first instructions corresponding to the adjusted content settings and indicative first visual settings;
determining second instructions corresponding to the adjusted content settings and indicative of audio settings;
causing the first instructions to be applied to the first device; and
sending the second instructions to a third device.

8. The method of claim 7, further comprising:
determining a first model of the first device; and
determining a second model of a the third device,
wherein the first input data and second input data are applied to an algorithm to determine the adjusted content settings, the algorithm specific to the first model of the first device and the second model of the third device.

9. The method of claim 6, further comprising:
determining that the first input data and second input data correspond to a default content setting of the first device; and
causing the default content setting to be selected on the first device.

10. The method of claim 6, further comprising:
determining instructions to change current content settings;
sending instructions to change current content settings, the first input data, and the second input data to a default settings controller to cause the default settings controller to change the current content settings based on the first input data and second input data.

11. The method of claim 6, wherein the first input data is indicative of time data and the second input data is indicative of ambient light data, and further comprising:
determining adjusted content settings based on the first input data and second input data, the adjusted content settings indicative of a dynamic range.

12. The method of claim 6, wherein the first input data is one of ambient light data, ambient volume data, audio data, visual data, or displayed content data, and wherein the second input data is one of calendar data, schedule data, weather data, sunset data, smart home data, smart device or user account data.

13. The method of claim 6, wherein first input data is indicative of a current time point and second input data is indicative of a final time point corresponding to a sunset at the location of the first device, and further comprising:

determining an impending change in the current content settings based on the first input data and the second input data; and determining transition content settings for time points between the current time point and the final time point, each transition content setting corresponding to a time point between the current time point and the final time point.

14. A system comprising:

memory configured to store computer-executable instructions, and at least one computer processor configured to access memory and execute the computer-executable instructions to:

determine, by a first application running on a first device, first input data;

request, by the first application running on the first device, second input data from a second device;

receive, by the first application running on the first device, second input data from the second device;

determine, by the first application running on the first device, current content settings indicative of parameters selected for presenting content data on the first device, the current content settings corresponding to one or more of a brightness setting and a volume setting on the first device;

determine, by the first application running on the first device, that current content settings should be adjusted based on the first input data and second input data; and cause, by the first application running on the first device, the current content settings on the first device to be adjusted based on the first input data and the second input data, wherein adjusting the current content settings changes a presentation of the content data on the first device.

15. The system of claim 14, wherein the at least one computer processor is further configured to access memory and execute the computer-executable instructions to:

determine adjusted content settings based on the first input data and second input data;

determine first instructions corresponding to the adjusted content settings and indicative first visual settings;

determine second instructions corresponding to the adjusted content settings and indicative of audio settings;

cause the first instructions to be applied to the first device; and send the second instructions to a third device.

16. The system of claim 15, wherein the at least one computer processor is further configured to access memory and execute the computer-executable instructions to:

determine a first model of the first device; and determine a second model of a the third device, wherein the first input data and second input data are applied to an algorithm to determine the adjusted content settings, the algorithm specific to the first model of the first device and the second model of the third device.

17. The system of claim 14, wherein the at least one computer processor is further configured to access memory and execute the computer-executable instructions to:

determine that the first input data and second input data correspond to a default setting of the first device; and cause the default setting to be selected on the first device.

18. The system of claim 14, wherein the at least one computer processor is further configured to access memory and execute the computer-executable instructions to:

determine instructions to change current content settings;

send instructions to change current content settings, the first input data, and the second input data to a default settings controller to cause the default settings controller to change the current content settings based on the first input data and second input data.

19. The system of claim 14, wherein the first input data is indicative of time data and the second input data is indicative of ambient light data, and wherein the at least one computer processor is further configured to access memory and execute the computer-executable instructions to:

determine adjusted content settings based on the first input data and second input data, the adjusted content settings indicative of a dynamic range of audio content.

20. The system of claim 14, wherein the first input data is one of ambient light data, ambient volume data, audio data, visual data, or displayed content data, and wherein the second input data is one of calendar data, schedule data, weather data, sunset data, smart home data, or user account data.

* * * * *